(12) United States Patent
Arbjerg et al.

(10) Patent No.: US 10,730,548 B2
(45) Date of Patent: Aug. 4, 2020

(54) HYDRAULIC STEERING UNIT (71) Applicant: Danfoss Power Solutions ApS, Nordborg (DK)

(72) Inventors: Niels Arbjerg, Sydals (DK); Charles Anthony Bates, Soenderborg (DK); Poul Ennemark, Soenderborg (DK); Mogens Frederiksen, Sydals (DK); Casper Mikael Olesen, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 153 days.

(21) Appl. No.: 15/970,239

(22) Filed: May 3, 2018

(65) Prior Publication Data
US 2018/0319428 A1    Nov. 8, 2018

(30) Foreign Application Priority Data
May 8, 2017    (DE) .................. 10 2017 109 796

(51) Int. Cl.
*B62D 5/065*    (2006.01)
*B62D 5/093*    (2006.01)
(Continued)

(52) U.S. Cl.
CPC ............... *B62D 5/065* (2013.01); *B62D 5/08* (2013.01); *B62D 5/093* (2013.01); *B62D 5/14* (2013.01)

(58) Field of Classification Search
CPC ................................ B62D 5/065; B62D 5/093
See application file for complete search history.

(56) References Cited

U.S. PATENT DOCUMENTS 4,676,334 A    6/1987    Nakamura et al.
5,515,938 A    5/1996    Haga et al.
(Continued)

FOREIGN PATENT DOCUMENTS

CN    2664968 Y    12/2004
CN    106043420 A    10/2016
(Continued)

OTHER PUBLICATIONS

International Search Report for Serial No. PCT/EP2018/060037 dated Apr. 19, 2018.

*Primary Examiner* — Kevin Hurley
(74) *Attorney, Agent, or Firm* — McCormick, Paulding & Huber PLLC (57) ABSTRACT

A hydraulic steering unit (1) is described comprising a supply port arrangement having a pressure port (P) connected to a main flow path (2) and a tank port (T) connected to a tank flow path (3), a working port arrangement having a left working port (L) connected to a left working flow path (4) and a right working port (R) connected to a right working flow path (5), a bridge arrangement (21) of variable orifices (A2L, A3L, A2R, A3R) having a first left orifice (A2L) connected to the main flow path (2) and to the left working flow path (4), a first right orifice (A3R) connected to the main flow path (2) and to the right working flow path (5), a second left orifice (A3L) connected to the left working flow path (4) and to the tank flow path (3), and a second right orifice (A3R) connected to the right working flow path (5) and to the tank flow path (3). Such a steering unit allows steering a vehicle with low energy consumption. To this end a load sensing port (LS) is provided, the load sensing port (LS) signaling a pressure in the steering unit (1) to the outside.

19 Claims, 5 Drawing Sheets

(51) Int. Cl.
*B62D 5/08* (2006.01)
*B62D 5/14* (2006.01)

(56) References Cited

U.S. PATENT DOCUMENTS 9,550,521 B2 * 1/2017 Andersen ............... B62D 5/093
2011/0272204 A1 11/2011 Nell et al.

FOREIGN PATENT DOCUMENTS

| | | |
|---|---|---|
| CN | 106143602 A | 11/2016 |
| DE | 2944883 A1 | 5/1981 |
| DE | 19963343 A1 | 7/2001 |
| DE | 102005011526 A1 | 10/2006 |
| JP | H09263256 A | 10/1997 |

* cited by examiner

HYDRAULIC STEERING UNIT

CROSS-REFERENCE TO RELATED APPLICATIONS

This application claims foreign priority benefits under U.S.C. § 119 to German Patent Application No. 10 2017 109 796.1 filed on May 8, 2017, the content of which is hereby incorporated by reference in its entirety.

TECHNICAL FIELD

The present invention relates to a hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left flow path, a first right orifice connected to the main flow path and to the right working flow path, a second left orifice connected to the left working flow path and to the tank flow path, and a second right orifice connected to the right working flow path and to the tank flow path.

BACKGROUND

Such a hydraulic steering unit is known, for example, from U.S. Pat. No. 4,676,334.

The variable first and second orifices are arranged in a kind of Wheatstone bridge, in which one diagonal of the bridge arrangement is connected to the pressure port and to the tank port and the other diagonal of the bridge arrangement is connected to the two working ports.

When a steering motor connected to the working port arrangement should be steered to the left, for example, the variable first left orifice is opened and at the same time the variable second right orifice is opened so that the flow of hydraulic fluid is directed through the left working flow path to the steering motor and from the steering motor back through the right working flow path and the second right orifice to the tank.

SUMMARY

The object underlying the invention is to steer a vehicle with low energy consumption.

This object is solved with a hydraulic steering unit as described at the outset in that a load sensing port is provided, the load sensing port signaling a pressure in the steering unit to the outside.

In such a steering unit the pressure appearing at the load sensing port can be used to control a pressure source so that the pressure source supplies hydraulic fluid only with the necessary pressure and amount.

In an embodiment of the invention a measuring motor is arranged in one of the working flow paths. When the hydraulic steering unit is operated, a driver of a vehicle actuates a steering wheel or the like. This actuation causes an opening of a first orifice on one side and of a second orifice on the other side of the bridge arrangement depending on the desired direction of steering. The measuring motor is driven by the fluid flowing from the pressure port to the working port arrangement. The measuring motor is operatively connected to the variable orifices to bring them back to their original opening degree which may be closed or opened to a minimum extend once the necessary amount of fluid has been supplied to the working port arrangement. Since the measuring motor is arranged in one of the working flow paths, there is no or only a minimum dead band when changing from one steering direction to the other.

In an embodiment of the invention the load sensing port is connected to a point upstream the bridge arrangement. This is basically a pressure which is needed for steering the vehicle. In this way a dynamic load sensing can be used. This load sensing can be realized with a bridge arrangement having neutral open orifices.

In an embodiment of the invention a pressure relief valve is arranged in a flow path between a point upstream the bridge arrangement and the tank port. This pressure relief valve can be used to avoid a too high pressure at the load sensing port.

In an embodiment of the invention a drain orifice is arranged in parallel to the pressure relief valve. In this way it is possible to use a bridge arrangement having neutral closed orifices.

In an embodiment of the invention a copying valve is arranged in parallel to the pressure relief valve. The copying valve copies the pressure at the point upstream the bridge arrangement to the load sensing port.

In an embodiment of the invention the bridge arrangement comprises neutral open orifices. In this case, a permanent flow of hydraulic fluid is established through the steering unit.

In an embodiment of the invention the load sensing port is connected to the tank flow path via a drain orifice. Here, a dynamic load sensing can be realized with neutral open self-realignment.

In an embodiment of the invention the load sensing port is connected to the working flow path via a shuttle-valve guiding the higher of the pressures in the working flow paths to the load sensing port. In this way, a static load sensing type can be realized with opened/closed self-realignment.

In an embodiment of the invention a further orifice arrangement is arranged between the pressure port and the tank port. The further orifice arrangement can comprise a main orifice in the main flow path, a tank orifice in the tank flow path and third left and right orifices in the left working flow path and the right working flow path, respectively. The further orifice arrangement can have a subset of the mentioned orifices.

BRIEF DESCRIPTION OF THE DRAWINGS

Preferred embodiments of the invention will now be described in more detail with reference to the drawing, wherein.

In all Figures the same elements are referred to with the same reference numerals.

DETAILED DESCRIPTION

Figures 1, 2, 3:
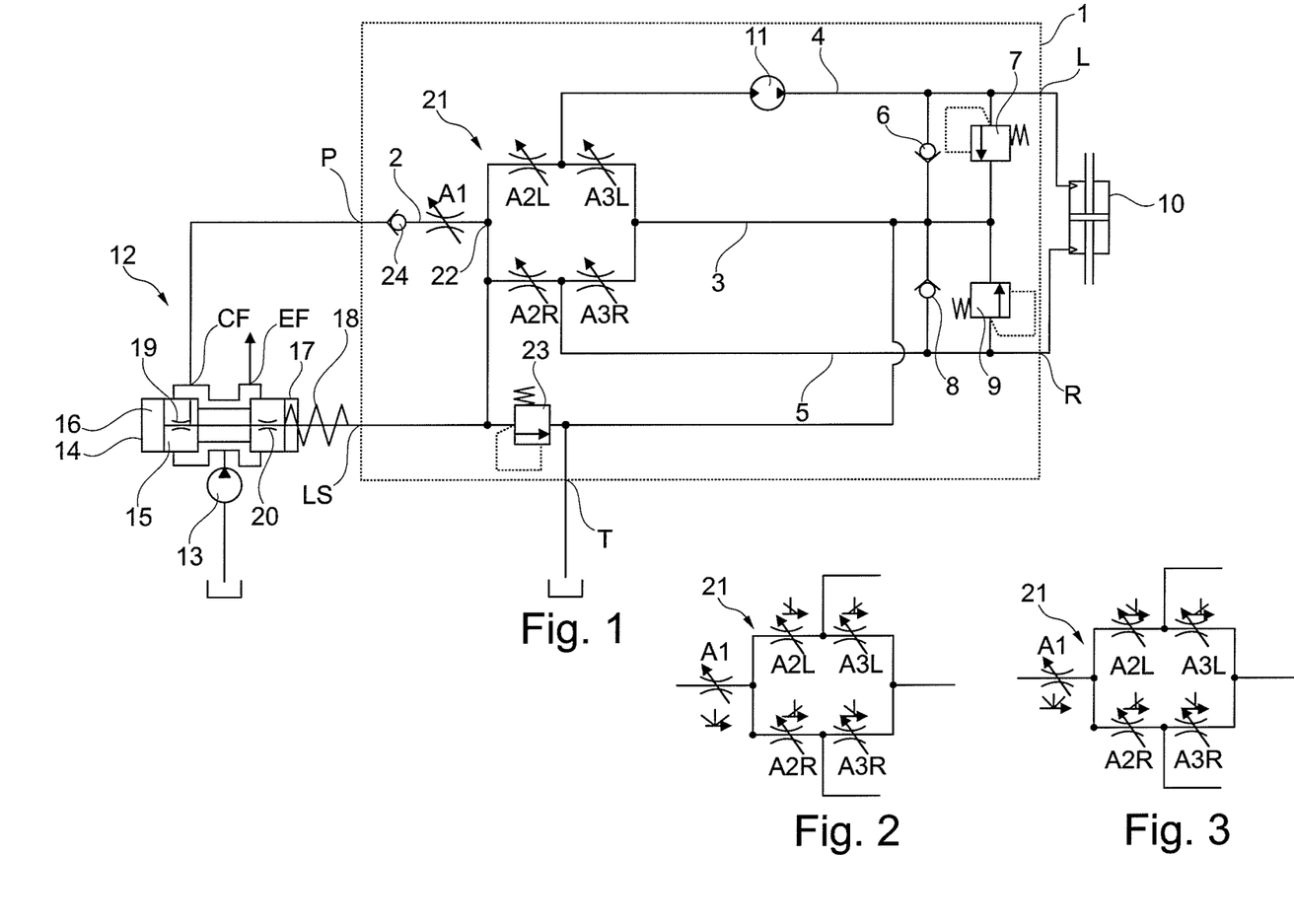
FIG. 1 shows a schematic circuit diagram of a first embodiment of a steering unit.
FIG. 2 shows a first embodiment of a bridge arrangement.
FIG. 3 shows a second embodiment of a bridge arrangement.

FIG. 1 shows a steering unit 1 having a pressure port P and a tank port T. The pressure port P and the tank port T together form a supply port arrangement. The steering unit comprises a left working port L and a right working port R. The two working ports L, R form a working port arrangement.

The pressure port P is connected to a main flow path 2. The tank port T is connected to a tank flow path 3. The left working port L is connected to a left working flow path 4. The right working port R is connected to a right working flow path 5. The tank flow path 3 is connected to the left working flow path 4 via a check valve 6 opening in a direction to the left working flow path 4. Furthermore, the left working flow path 4 is connected to the tank flow path 3 via a pressure relief valve 7. The tank flow path 3 is connected to the right working flow path 5 via a check valve 8 opening in a direction towards the right working flow path 5. The tank flow path 3 is connected to the right working flow path 5 via a pressure relief valve 9.

A steering motor 10 is connected to the working ports L, R.

A measuring motor 11 is arranged in the left working flow path 4. In an alternative embodiment, the measuring motor 11 can be arranged in the right working flow path 5.

The pressure port P is connected to a pressure source 12. The pressure source 12 comprises a pump 13 which can be a fixed displacement pump. A priority valve 14 is arranged between the pump 13 and the pressure port P. The priority valve 14 comprises a priority output CF and a secondary output EF. Furthermore, the priority valve 14 comprises a valve element 15 which is actuated by pressures in a first pressure chamber 16 and a pressure in a second pressure chamber 17, wherein the pressures in the pressure chambers 16, 17 act in opposite directions. Furthermore, a spring 18 acts on the valve element 15 in the same direction as the pressure in the pressure chamber 17.

The pressure chamber 16 is connected to the priority output CF via a bleed 19. The second pressure chamber 17 is connected to a load sensing port LS of the steering unit 1. Furthermore, the second pressure chamber 17 is connected to the first bleed 19 via a second bleed 20 which is arranged in the valve element 15.

The steering unit 1 comprises a bridge arrangement 21 of variable orifices. The bridge arrangement 21 comprises a first left orifice A2L, which is arranged between the main flow path 2 and the left working flow path 4. The bridge arrangement 21 comprises a first right orifice A2R arranged between the main flow path 2 and the right working flow path 5. The bridge arrangement 21 comprises a second left orifice A3L arranged between the left working flow path 4 and the tank flow path 3. Furthermore, the bridge arrangement 21 comprises a second right orifice A3R between the right working flow path 5 and the tank flow path 3.

The load sensing port LS is connected to a point 22 upstream the bridge arrangement 21. Furthermore, the load sensing port LS is connected by means of a pressure relief valve 23 to the tank port T.

A check valve 23 opening in direction towards the bridge arrangement 21 is arranged between the pressure port P and the bridge arrangement 21. Furthermore, a variable main orifice A1 can be arranged in the main flow path 2.

The orifices A2L, A3L, A2R, A3R can be, for example, formed by a spool-sleeve set, wherein the sleeve is rotatably arranged within a housing and the spool is rotatably arranged within the sleeve. When the spool and the sleeve are rotated relatively to each other some of the orifices are opened and other orifices are closed.

When a vehicle equipped with such a steering unit 1 should be steered to the left, for example, a steering wheel is turned accordingly. The spool is rotated out of a neutral position relatively to the sleeve in order to open the first left orifice A2L and the second right orifice A3R. The second left orifice A3L and the first right orifice A2R are closed or remain closed. Hydraulic fluid from the pressure port P then flows through the left working flow path 4 to the left working port L. The measuring motor arranged in the left working flow path 4 is driven by this fluid. The measuring motor restores the original or neutral position of the spool and the sleeve once the required amount of hydraulic fluid has been supplied to the steering motor 10. Hydraulic fluid displaced from the steering motor 10 enters the steering unit via the right working port R and returns to the tank port T via the right working flow path 5, the second right orifice A3R and the tank flow path 3.

When no flow is needed to actuate the steering motor 10, a valve element 15 of the priority valve 14 is moved by the pressure in the first pressure chamber 16 to the right (as seen in FIG. 1) to close the priority output CF and to open the secondary output EF.

FIGS. 2 and 3 show different embodiments of the bridge arrangement 21.

In FIG. 2 the orifices A2L, A3 L, A2R, A3R of the bridge arrangement are neutral open orifices which is symbolized by symbol near the respective orifices. This means that in neutral position the orifices allow for a small flow of fluid.

FIG. 3 shows an embodiment of the bridge arrangement 21 in which the orifices A2L, A3L, A2R, A3R are neutral closed orifices. In this embodiment there is no flow of hydraulic fluid in the neutral position of the bridge arrangement.

The embodiment of FIG. 1 uses the bridge arrangement 21 of FIG. 2, i.e. it uses a set of neutral open orifices A2L, A3L, A2R, A3R. As long as there is no steering demand, there is a small flow of hydraulic fluid through the bridge arrangement through the main orifice A1 arranged in the main flow path 2.

Therefore, the pressure at the point 22 upstream the bridge arrangement 21 is somewhat lower at the pressure at the priority output CF of the priority valve. The pressure at this output CF is, however, the pressure of the first pressure chamber 16. The pressure at the point 22 upstream the bridge arrangement 21 is the same as the pressure in the second pressure chamber 17 of the priority valve. Therefore, the valve element 15 is moved to close the priority output CF and to open the secondary output EF.

When the steering wheel is actuated, the pressure at the point 22 upstream the bridge arrangement 21 increases since the main orifice A1 opens as well. In this case the additional force of the spring 18 pushes the valve element 15 to the left to open the priority outlet CF and to close the secondary output EF.

In this way a dynamic load sensing behavior can be realized.

Figure 4:
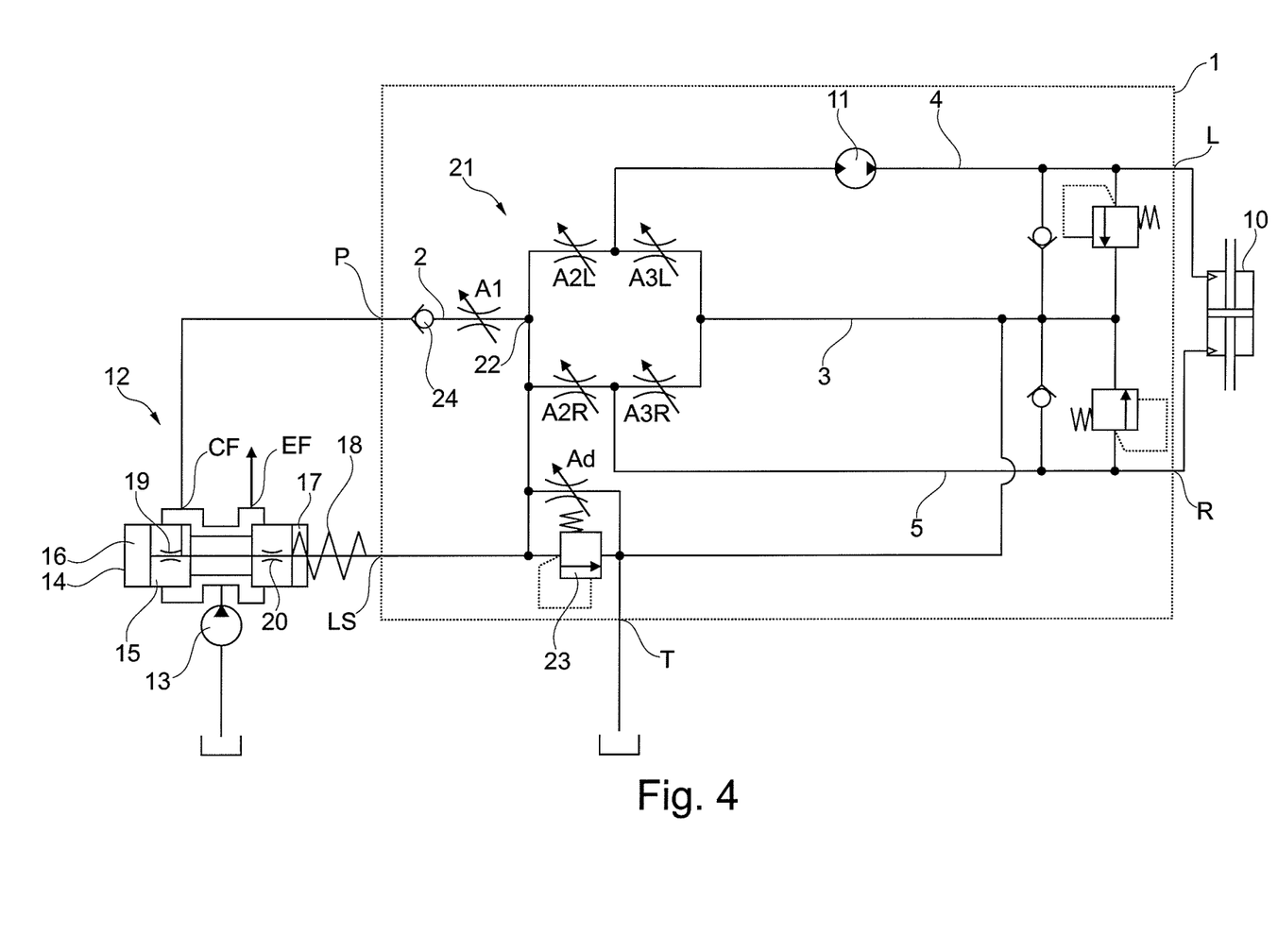
FIG. 4 shows a second embodiment of the steering unit.
Figure 5:
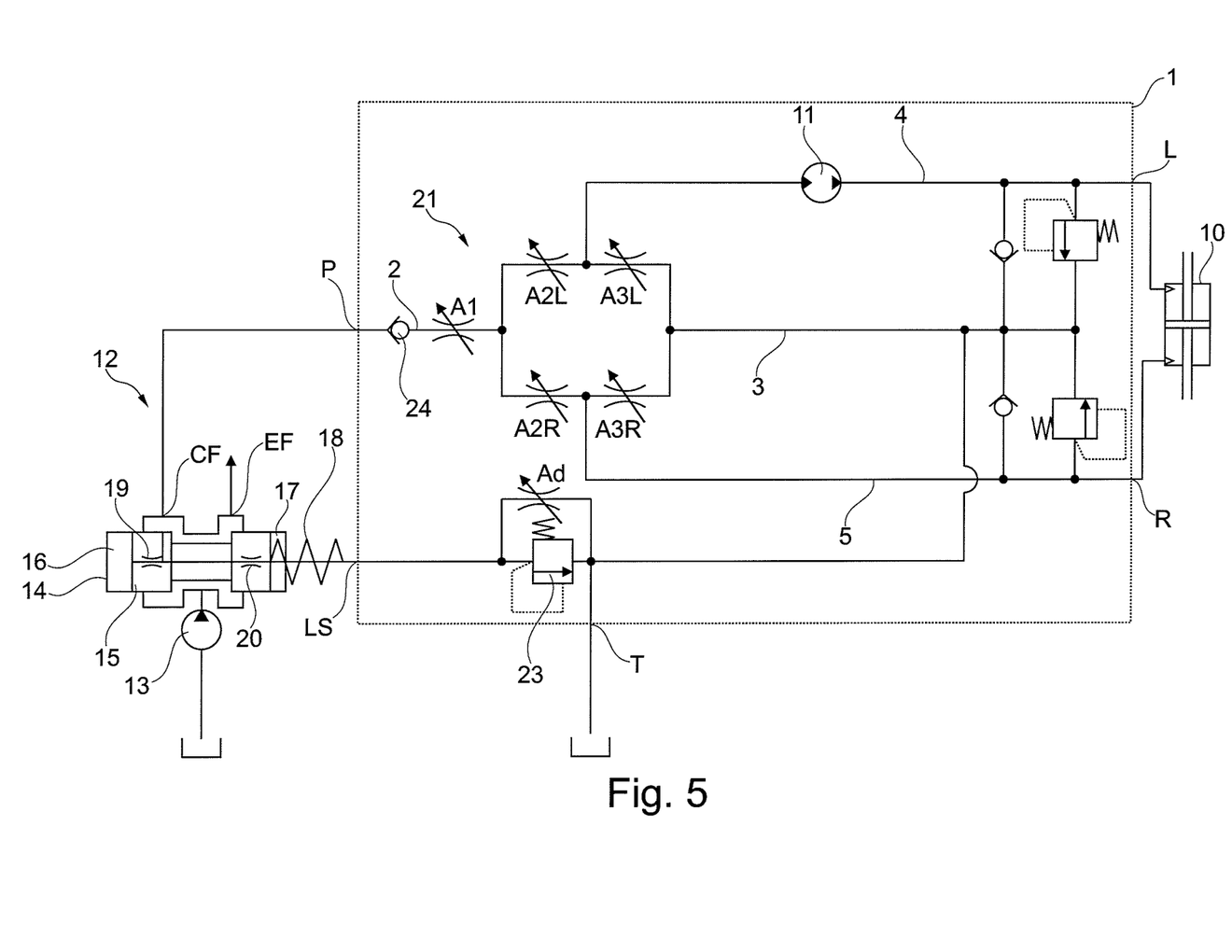
FIG. 5 shows a third embodiment of the steering unit.

FIG. 4 shows a slightly amended embodiment in which the bridge arrangement 21 uses the neutral closed orifices A2L, A3L, A2R, A3R shown in FIG. 3. The main orifice A1 is a neutral closed orifice as well. In this case, there is a drain bleed Ad arranged in parallel to the pressure relief valve 23. The drain bleed Ad allows a permanent flow of hydraulic fluid from the second pressure chamber 17 of the priority valve 14 to the tank port T. The drain bleed Ad is closed, when the drain bleed A1 is opened. When the drain bleed Ad is closed or the throttling resistance is increased, the pressure in the second pressure chamber 17 of the priority valve 14 increases to shift the valve element 15 of the priority valve 14 in the direction to open the priority output CF and to close or throttle the secondary output EF.

In the embodiment shown in FIG. 4 the load sensing port LF is connected to the tank flow path 3 via the drain bleed Ad. The priority valve 14 is the same as shown in FIGS. 1 and 4. When no steering is demanded, the drain bleed Ad is opened and allows for a small flow of hydraulic fluid from the pump 13 through the second orifice 20 into the second pressure chamber 17 and from there to the load sensing port LF through the drain bleed Ad to the tank port T. Since the pressure in the first pressure chamber 16 is higher than the pressure in the second pressure chamber 17, the flow through the priority output CF is throttled and the secondary output EF is opened.

When, however, a steering demand occurs, the drain bleed Ad is closed so that the pressure at the pressure port LS increases and the priority valve 14 is actuated to open the priority output CF.

In this way a dynamic load sensing can be realized. The bridge arrangement 21 can have neutral open or neutral closed orifices.

Figure 6:
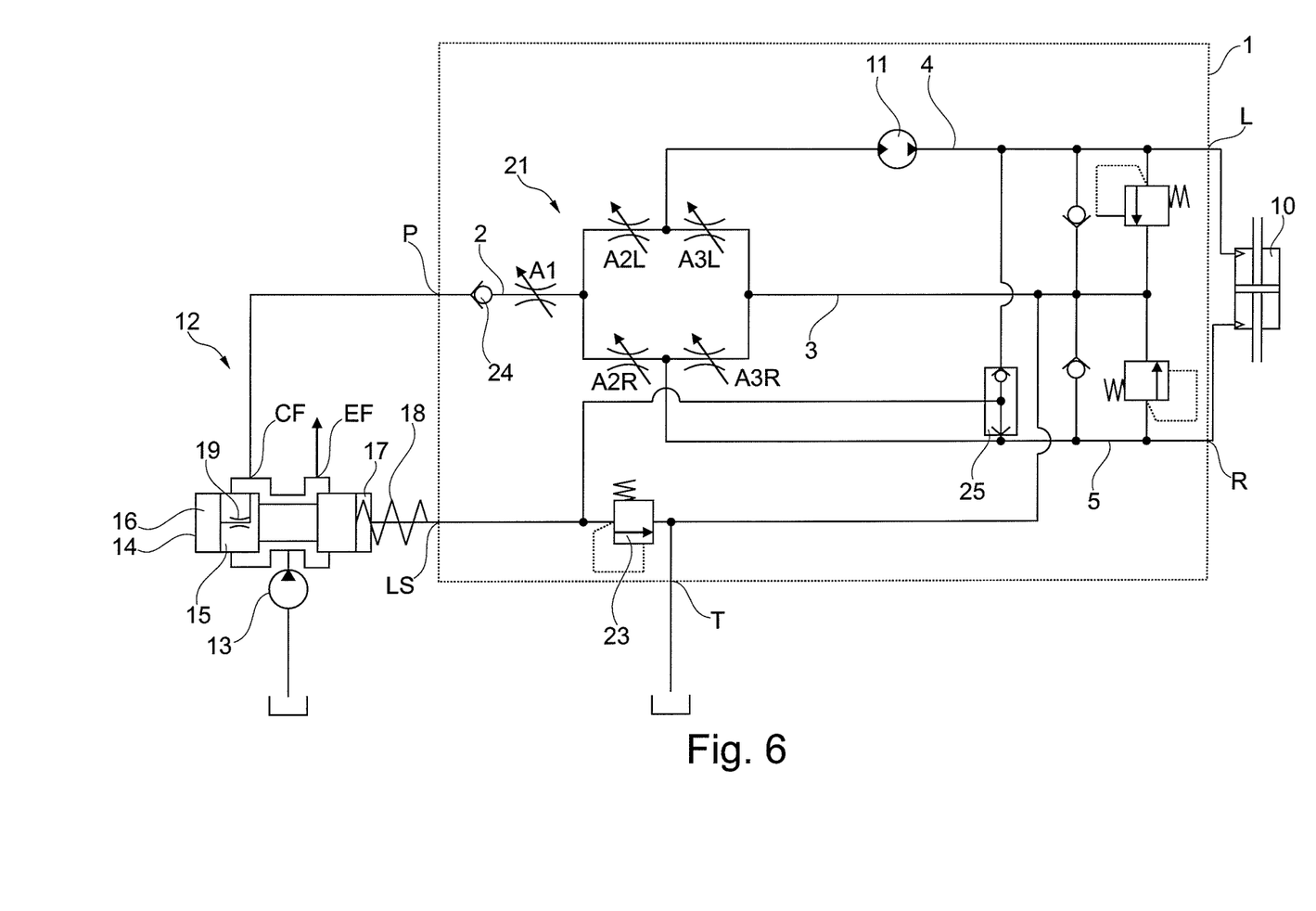
FIG. 6 shows a fourth embodiment of the steering unit.

In the embodiment shown in FIG. 6 a load sensing port LS is connected to a shuttle valve 25. The shuttle valve 25 is connected to the left working flow path 4 and to the right working flow path 5. The highest pressure of the two working flow paths 4, 5 is then present at the load sensing port LS. This is a static load sensing. The bridge arrangement 21 has neutral open or neutral closed orifices.

Figure 7:
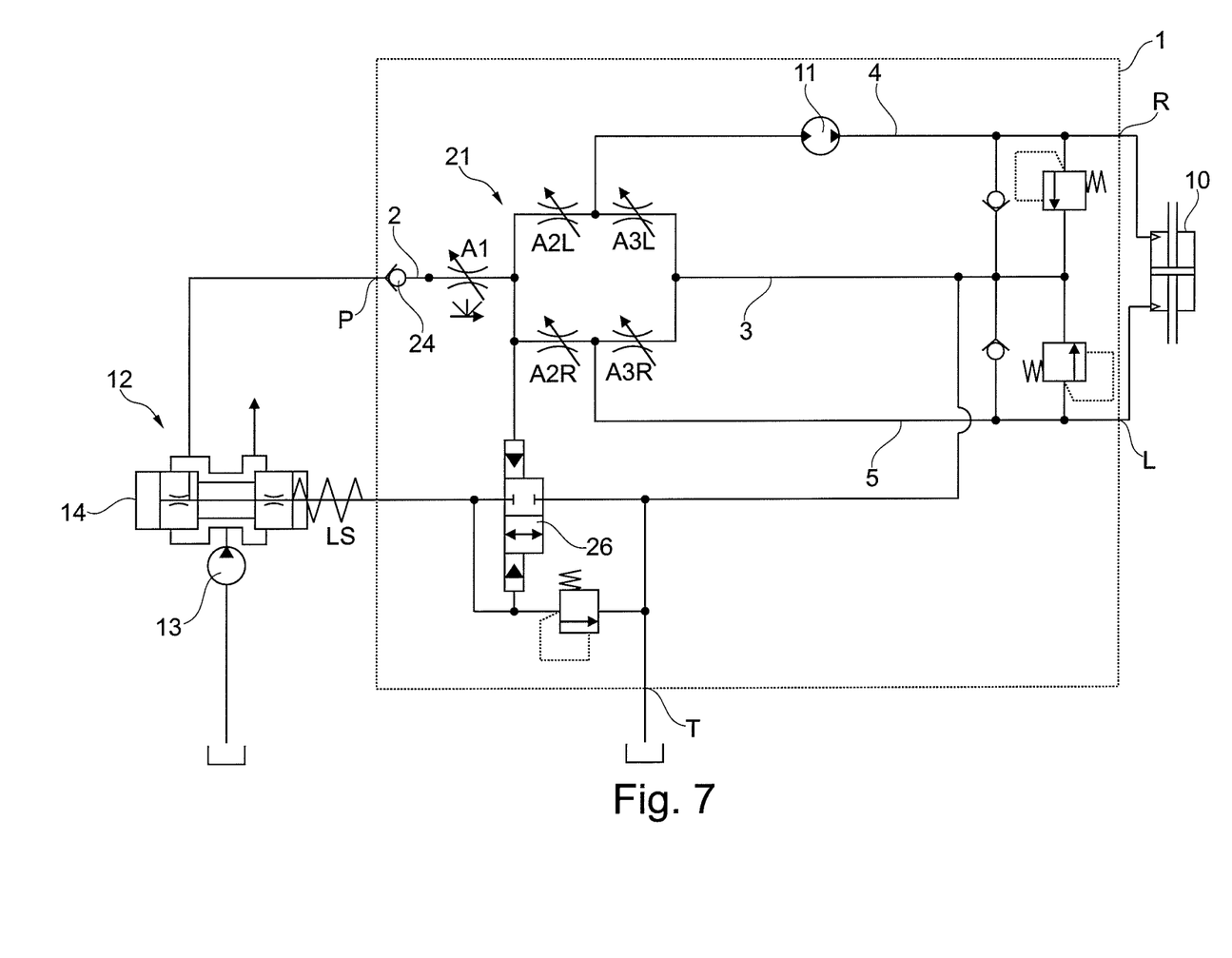
FIG. 7 shows a fifth embodiment of the steering unit.

FIG. 7 shows an embodiment in which a copying valve 26 is arranged in parallel to the pressure relief valve 23. The copying valve is actuated by a pressure at the point 22 upstream the bridge arrangement 21 and by a pressure at the load sensing port LS. When the pressure at the load sensing port LS is higher than the pressure at the point 22 upstream the bridge arrangement 21 the copying valve 26 opens so that the pressure at the load sensing port LS decreases until it is lower than the pressure at the point 22 upstream the bridge arrangement 21. In this moment the copying valve 26 closes and interrupts a connection between the load sensing port LS and the tank port T so that the pressure at the load sensing port LS increases again. This cycle is repeated and finally a pressure will occur at the load sensing port LS which corresponds to the pressure at the point 22 upstream the bridge arrangement 21 thereby copying this pressure to the load sensing port LS.

This embodiment is in particular of advantage when used with a bridge arrangement 21 having neutral open orifices A2L, A3L, A2R, A3R.

When a main orifice A1 is used in the main flow path 2, this main orifice A1 can be a neutral closed orifice so that no hydraulic fluid can reach the bridge arrangement 21. In this way a closed neutral can be achieved.

In another embodiment the main orifice A1 can allow a small permanent flow. However, this flow is minimized in the neutral position. An outcome of having a lower supply flow entering the bridge arrangement 21 is that the general pressure level inside the bridge arrangement 21 will be lowered and therefore the outer forces acting on the steering motor 10 will have a greater impact on the steering system, in particular the gear set of the measuring motor 11, thereby improving the self-realignment capabilities.

In a way not shown, there are other possibilities to arrange a further orifice arrangement between the pressure P and the tank port T.

It is, for example, possible to arrange a tank orifice in the tank flow path 3. The tank orifice can be a fixed orifice. In this case it can be used for creating a back pressure that is independent on the opening degree of the first and second orifices in their respective flow paths. When a spool-sleeve set is used, the back pressure is independent of the spool-sleeve angle for improved stability.

It is, however, also possible to use a variable tank orifice to decrease the resistance across the variable second orifices A3L, A3R and to improve the emergency steering.

Furthermore, the further orifice arrangement can comprise a variable third left orifice arranged in the left working flow path 4 and a variable third right orifice arranged in the right working flow path 5. This allows for the possibility to make a closed-neutral set of orifices in an open-center system. In particular, when a spool and a sleeve are used, it is possible to make a closed-neutral spool-sleeve set.

The variable third left orifice and the variable third right orifice open faster than the variable first left orifice A2L and the variable first right orifice A2R. The variable third orifices are in principle used to cut off the working flow paths and to trap hydraulic fluid in the working paths 4, 5 and in the respective pressure chambers of the steering motor 10.

It is, of course, possible to use only a subset of the mentioned main orifice A1, the tank orifice and the third orifices.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising a supply port arrangement having a pressure port (P) connected to a main flow path and a tank port (T) connected to a tank flow path, a working port arrangement having a left working port (L) connected to a left working flow path and a right working port (R) connected to a right working flow path, a bridge arrangement of variable orifices (A2L, A3L, A2R, A3R) having a first left orifice (A2L) connected to the main flow path and to the left working flow path, a first right orifice (A3R) connected to the main flow path and to the right working flow path, a second left orifice (A3L) connected to the left working flow path and to the tank flow path, and a second right orifice (A3R) connected to the right working flow path and to the tank flow path, wherein a load sensing port (LS) is provided, the load sensing port (LS) signaling a pressure in the steering unit to the outside, and wherein a measuring motor is arranged in one the working flow paths.

2. The hydraulic steering unit according to claim 1, wherein the load sensing port (LS) is connected to a point upstream the bridge arrangement.

3. The hydraulic steering unit according to claim 2, wherein a pressure relief valve is arranged in a flow path between the point upstream the bridge arrangement and the tank port.

4. The hydraulic steering unit according to claim 3, wherein a drain orifice (Ad) is arranged in parallel to the pressure relief valve.

5. The hydraulic steering unit according to claim 3, wherein a copying valve is arranged in parallel to the pressure relief valve.

6. The hydraulic steering unit according to claim 5, wherein the bridge arrangement comprises neutral open orifices.

7. The hydraulic steering unit according to claim 1, wherein the load sensing port (LS) is connected to the tank flow path via a drain orifice (Ad).

8. The hydraulic steering unit according to claim 1, wherein the load sensing port (LS) is connected to the working flow paths via a shuttle-valve guiding the higher of the pressures in the working flow paths to the load sensing port (LS).

9. The hydraulic steering unit according to claim 1, wherein a further orifice arrangement (A1) is arranged between the pressure port (P) and the tank port (T).

10. The hydraulic steering unit according to claim 2, wherein a further orifice arrangement (A1) is arranged between the pressure port (P) and the tank port (T).

11. The hydraulic steering unit according to claim 3, wherein a further orifice arrangement (A1) is arranged between the pressure port (P) and the tank port (T).

12. The hydraulic steering unit according to claim 4, wherein a further orifice arrangement (A1) is arranged between the pressure port (P) and the tank port (T).

13. The hydraulic steering unit according to claim 5, wherein a further orifice arrangement (A1) is arranged between the pressure port (P) and the tank port (T).

14. The hydraulic steering unit according to claim 6, wherein a further orifice arrangement (A1) is arranged between the pressure port (P) and the tank port (T).

15. The hydraulic steering unit according to claim 7, wherein a further orifice arrangement (A1) is arranged between the pressure port (P) and the tank port (T).

16. A hydraulic steering unit comprising a supply port arrangement having a pressure port (P) connected to a main flow path and a tank port (T) connected to a tank flow path, a working port arrangement having a left working port (L) connected to a left working flow path and a right working port (R) connected to a right working flow path, a bridge arrangement of variable orifices (A2L, A3L, A2R, A3R) having a first left orifice (A2L) connected to the main flow path and to the left working flow path, a first right orifice (A3R) connected to the main flow path and to the right working flow path, a second left orifice (A3L) connected to the left working flow path and to the tank flow path, and a second right orifice (A3R) connected to the right working flow path and to the tank flow path, wherein a load sensing port (LS) is provided, the load sensing port (LS) signaling a pressure in the steering unit to the outside, and wherein the load sensing port (LS) is connected to the tank flow path via a drain orifice (Ad).

17. The hydraulic steering unit according to claim 16, wherein a further orifice arrangement (A1) is arranged between the pressure port (P) and the tank port (T).

18. A hydraulic steering unit comprising a supply port arrangement having a pressure port (P) connected to a main flow path and a tank port (T) connected to a tank flow path, a working port arrangement having a left working port (L) connected to a left working flow path and a right working port (R) connected to a right working flow path, a bridge arrangement of variable orifices (A2L, A3L, A2R, A3R) having a first left orifice (A2L) connected to the main flow path and to the left working flow path, a first right orifice (A3R) connected to the main flow path and to the right working flow path, a second left orifice (A3L) connected to the left working flow path and to the tank flow path, and a second right orifice (A3R) connected to the right working flow path and to the tank flow path, wherein a load sensing port (LS) is provided, the load sensing port (LS) signaling a pressure in the steering unit to the outside, and wherein the load sensing port (LS) is connected to the working flow paths via a shuttle-valve guiding the higher of the pressures in the working flow paths to the load sensing port (LS).

19. The hydraulic steering unit according to claim 18, wherein a further orifice arrangement (Al) is arranged between the pressure port (P) and the tank port (T).

* * * * *